July 13, 1948.  E. LEBENHART  2,444,996
COMBINED HANDLE AND CLOSURE MEANS
FOR FLEXIBLE RECEPTACLES
Filed March 15, 1945
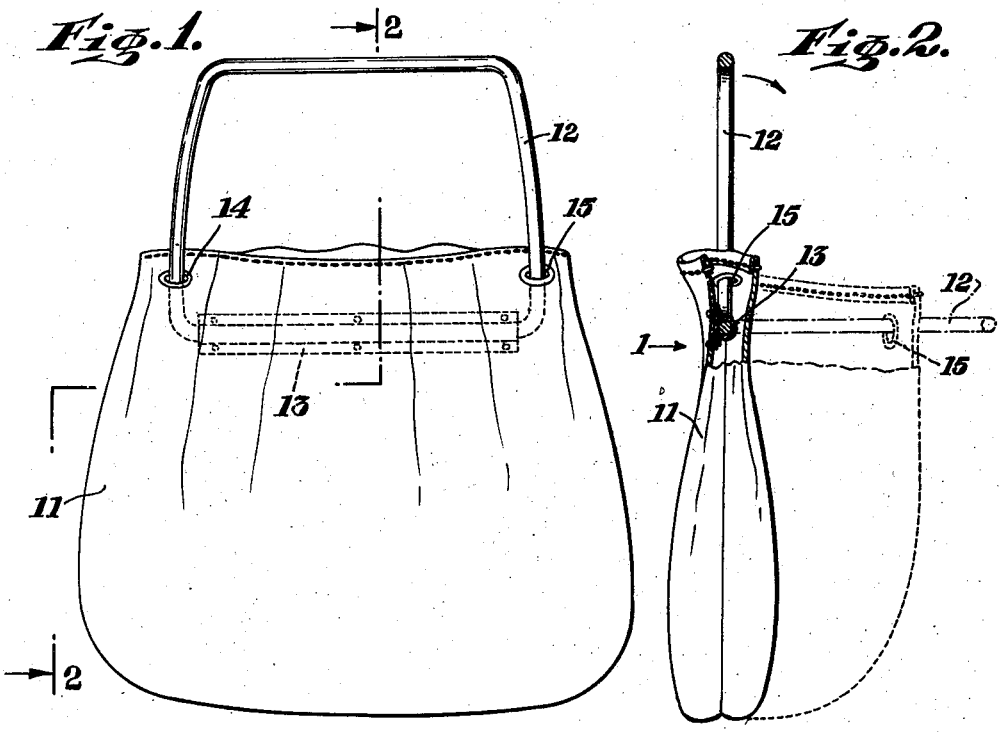
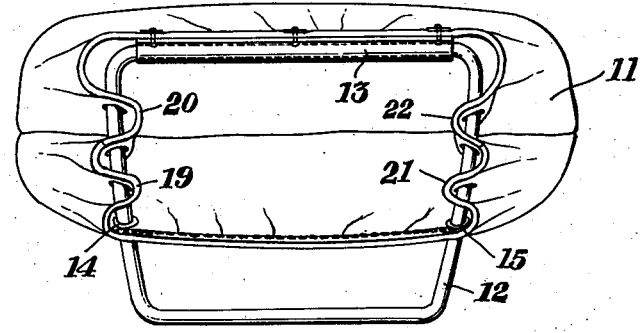
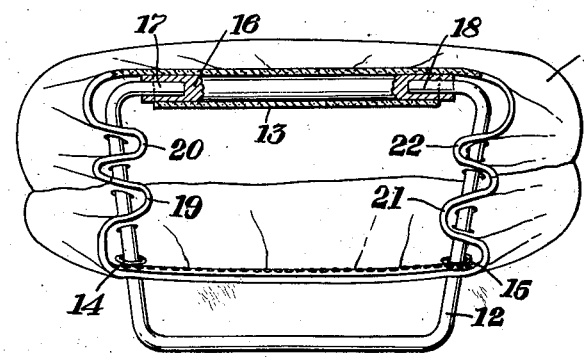
INVENTOR.
EDGAR LEBENHART Patented July 13, 1948

2,444,996

UNITED STATES PATENT OFFICE 2,444,996

COMBINED HANDLE AND CLOSURE MEANS FOR FLEXIBLE RECEPTACLES

Edgar Lebenhart, New York, N. Y.

Application March 15, 1945, Serial No. 582,873

4 Claims. (Cl. 150—12)

My invention relates to receptacles such as bags, sacks, pouches or the like having an expansible and contractible mouth portion, and has for its object to provide such receptacles with a handle which serves as a means for opening and closing the said mouth of the receptacle.

The novel features which I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawing, in which Fig. 1 shows a receptacle embodying the invention in front view in the direction of the arrow 1 in Fig. 2, Fig. 2 a side view thereof partly in section along the line 2—2 in Fig. 1, Fig. 3 a top view of a modified embodiment, and Fig. 4 a top view of still another modified embodiment partly in section.

The same reference characters indicate the same parts in all of the figures.

Referring first to the embodiment shown in Figs. 1 and 2 my improved receptacle 11, which has an expandable and contractable mouth portion, includes a handle 12 of any suitable form for instance of a stirrup, loop, hoop, or the like and is made from metal, wood or any other material of similar qualities. This handle 12 is jointed or hinged to one side of the receptacle near its mouth border by suitable means for example by the strip 13 which is secured to the receptacle as shown and surrounds the bottom part of the said handle. The two side arms of the handle 12 penetrate the opposite side of the receptacle through the eyelets 14 and 15 respectively. These eyelets are situated at a greater distance from the bottom of the receptacle than the distance at which the handle 12 is hinged thereto thus leaving, even while the receptacle is closed, a portion of the handle arms between these eyelets and the hinge or joint. To open the receptacle the handle 12 is swung in accordance with the arrow shown in Fig. 2 and while this is done the above mentioned portions of the handle 12 which are situated between the eyelets 14 and 15 respectively and the hinge or joint act as a lever pushing the right part of the receptacle 11 into the position shown in dotted lines in Fig. 2. In a similar manner the handle arms act again as levers when the handle 12 is put back in upright position to close the bag and make it ready for transportation.

In the modified embodiment of my invention shown in a top view in Fig. 3 the border portions of the receptacle extending from the eyelets 14 and 15 respectively towards the opposite side of the receptacle are creased into the shown zig-zag formation and the bellow folds 19, 20, 21, and 22 are provided with eyelets through which the handle arms penetrate.

The embodiment shown in a top view in Fig. 4 differs from the embodiment shown in Fig. 3 only with regard to the construction of the handle 12. Here the handle has the form of an open stirrup and its free ends 17 and 18 are embedded in corresponding holes of a stiffening piece 16 which is fastened to the receptacle in any suitable manner for instance by the strap 13 as also shown in Figs. 1 and 2. This stiffening piece may be made from any suitable material and may be of tubular or any other shape.

Although I have shown and described certain specific embodiments of my invention, I am fully aware that many modifications thereof are possible.

I claim:

1. A receptacle having an expansible and contractible mouth portion, said receptacle comprising a rigid handle member provided with arms connected to one side of the receptacle near its mouth, the arms of said handle member being slidingly connected with the opposite side of the receptacle at points beneath the mouth portion more distant from the bottom of the receptacle than the distance at which said handle member arms are connected to the receptacle.

2. A receptacle having an expansible and contractible mouth portion, said receptacle comprising a rigid handle member provided with arms connected to one side of the receptacle near its mouth, the arms of said handle member slidingly penetrating eyelets in the opposite side of the receptacle, these eyelets being more distant from the bottom of the receptacle than the distance at which said handle member arms are connected to the receptacle.

3. A receptacle having an expansible and contractible mouth portion, said receptacle comprising a rigid handle member provided with arms connected to one side of the receptacle near its mouth, the arms of said handle member being slidingly connected with the opposite side of the receptacle at points beneath the mouth portion more distant from the bottom of the receptacle than the distance at which said handle member arms are connected to the receptacle, and the border portions of the receptacle extending from the said sliding connection towards the opposite side of the receptacle being creased into zig-zag formation, the bellow folds thereof being also slidingly connected to the arms of said handle member.

4. A receptacle having an expansible and contractible mouth portion, said receptacle comprising a rigid handle member provided with arms connected to one side of the receptacle near its mouth, the arms of said handle member slidingly penetrating eyelets in the opposite side of the receptacle, these eyelets being more distant from the bottom of the receptacle than the distance at which said handle member arms are connected to the receptacle, and the border portions of the receptacle extending from the said eyelets towards the opposite side of the receptacle being creased into zig-zag formation, the bellow folds thereof being slidingly penetrated by the arms of the said handle member.

EDGAR LEBENHART.

REFERENCES CITED

The following references are of record in the file of this patent:

UNITED STATES PATENTS

| Number | Name | Date |
|---|---|---|
| 380,416 | Ames | Apr. 3, 1888 |
| 1,003,920 | Kuhn | Sept. 19, 1911 |
| 1,192,564 | Rogers | July 25, 1916 |
| 2,244,858 | Stember | June 10, 1941 |

FOREIGN PATENTS

| Number | Country | Date |
|---|---|---|
| 735,069 | France | Aug. 13, 1932 |